United States Patent [19]
Wacker

[11] Patent Number: 5,984,304
[45] Date of Patent: *Nov. 16, 1999

[54] METHOD AND DEVICE FOR PROCESSING OF SHEET MATERIAL

[75] Inventor: Rudolf Wacker, Rombach, Switzerland

[73] Assignee: Gretag Imaging AG, Regensdorf, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 09/053,699

[22] Filed: Apr. 2, 1998

[30] Foreign Application Priority Data

Apr. 7, 1997 [EP] European Pat. Off. .............. 97105704

[51] Int. Cl.$^6$ .................................................. B65H 39/10
[52] U.S. Cl. ........................... 271/288; 271/296; 271/298; 271/299; 271/3.14
[58] Field of Search ..................................... 271/288, 296, 271/298, 299, 300, 302, 303; 209/576, 659; 83/73, 102, 155; 198/358

[56] References Cited

FOREIGN PATENT DOCUMENTS

| 602 715 A2 | 6/1994 | European Pat. Off. . |
| 670 519 | 9/1995 | European Pat. Off. . |
| 41 30 565 | 11/1992 | Germany . |

*Primary Examiner*—William E. Terrell
*Assistant Examiner*—Gene O. Crawford
*Attorney, Agent, or Firm*—Burns, Doane, Swecker & Mathis, LLP

[57] ABSTRACT

Individual sheets of a sheet material to be treated which arrive in an arrival sequence, are distributed on two or more adjacently located conveying tracks. The sheets are conveyed along the conveying tracks through a processing station and are sorted thereafter in accordance with their arrival sequence. The distribution of the sheets is based on evaluating utilization of the conveying tracks to minimize the distance between sheets following each other on the same transport track. A throughput for sheets with varying length that is approximately equal to the throughput for sheets of same length is achieved.

10 Claims, 2 Drawing Sheets

METHOD AND DEVICE FOR PROCESSING OF SHEET MATERIAL

BACKGROUND OF THE INVENTION

1. Field of the Invention

The invention is directed to a method and apparatus for processing sheet material where individual sheets of the sheet material to be treated arrive in an arrival sequence, are distributed on two or more adjacently located conveying tracks, transported along the conveying tracks through a processing station and are resorted according to their original arrival sequence. More particularly, the invention is directed to a method and apparatus for the processing and development of photographic sheet material in a printer-paper processing combination arranged for single sheet processing.

2. State of the Art

A conventional minilab, equipped for processing of individual sheets, operates as follows: A single-sheet printer pulls photographic copying paper out of a cassette and cuts a sheet to a length corresponding to the format desired. The sheet is transported onto a paper stage where it is exposed in the proper image size and then removed. The exposed sheets are subsequently conveyed to a paper processor for development. The minilab processes different paper widths. In order to be able to fully utilize the paper processor in connection with narrow paper width, the sheets to be developed are conveyed or, transported on several tracks through the processor. The sheets, which are sequentially delivered from the printer, are distributed to the individual tracks of the paper processor by means of a transversal distributor. The papers are again collected in accordance with their original sequence at the output of the paper processor and stacked.

In known minilabs, the distribution of the sheets on the individual transport tracks of the paper processor takes place in accordance with a fixed cyclic sequence. Thus, in the case of three transport or, conveying tracks, every third sheet is directed to each of the tracks. Therefore, track 1 receives the first, fourth, seventh sheets and so on; track 2 receives the second, fifth, eighth sheets and so on; and track 3 receives the third, sixth, ninth sheets and so on. This fixed cyclic sequence is best suited for cases where sheets of the same size follow each other. However, if the sheets are of different length (for example, panorama format or APS film), large spaces are created between the sheets following each other on the individual transport tracks, and the paper processor is not fully utilized as these spaces are unused. As a result, productivity of the paper processor as well as the entire device is noticeably reduced.

SUMMARY OF THE INVENTION

An object of the present invention is to overcome this difficulty by providing an improved method and apparatus for processing sheet material where the throughput for processing sheets of different length is approximately equal to the throughput for processing sheets of the same length following each other.

In accordance with exemplary embodiments of the present invention, the sheets to be processed are no longer distributed to the individual tracks in accordance with a fixed cyclic distribution pattern; they are distributed by evaluating the utilization of the individual transport tracks. According to this approach, the spaces between sheets following each other on the same transport track are minimized and the utilization of the processing station is optimized.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE PREFERRED EMBODIMENTS

Figure 1:
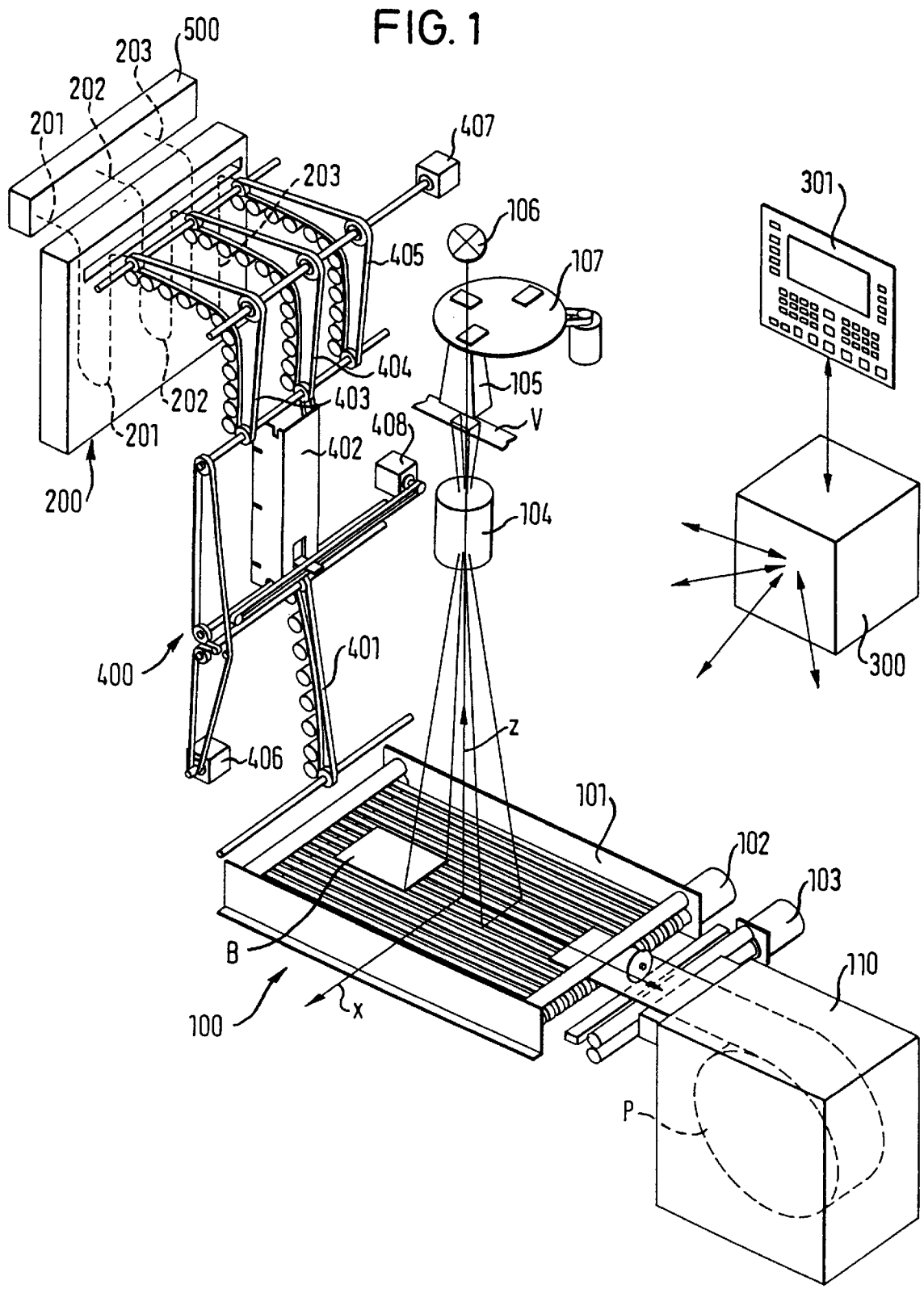
FIG. 1 illustrates a processing device of a minilab according to an exemplary embodiment of the present invention.

FIG. 1 illustrates the components of a minilab comprising an integrated photocopying device with a printer and a paper processor. The minilab of FIG. 1 comprises a photographic printer 100, a processing station in the form of a paper processor 200, and various connecting and controlling components which will be described later.

The printer 100 comprises a paper stage 101 with a paper transport 102 and a paper pull-out 103, an exposure lens 104, a light mixer 105 for applying printing light to the print blanks V, a print light source 106 and a filter device 107 for coloring the print light. A central computer 300 with an input/output unit 301 controls the printer 100 as well as the other components. The computer also controls the sequence of the method according to exemplary embodiments of the present invention. The connections between the computer 300 and the components working with the computer are not illustrated. A paper cassette 110 with a supply of print paper P wound in a roll is connected upstream of the printer 100. The printer 100 is conventional in all respects and therefore does not require a more detailed explanation.

The paper processor 200 is connected downstream, in relation to the paper path, of the printer 100. According to an exemplary embodiment as illustrated, the paper processor contains three transport tracks, along which the sheet material fed to the processor is transported. The three transport tracks are illustrated in the drawings by dotted lines 201, 202 and 203.

A sheet distribution device 400, of conventional construction, is located between the paper processor 200 and the printer 100. The sheet distribution device comprises a sheet feeding device 401, a transversal distributor 402 and three sheet removal devices 403, 404 and 405. The sheet feeding device 401 and the sheet removal devices 403, 404 and 405 are driven by two motors 406 and 407. Another motor 408 drives the transversal distributor 402. The three motors 406, 407 and 408 are triggered by the central computer 300. The sheet feeding device 401 picks up the individual exposed sheets "B" coming from the printer 100 and conveys them to the transversal distributor 402. In an exemplary embodiment, the sheets "B" are later distributed to the three sheet removal devices 403, 404 and 405, which, in turn, feeds them to the three transport tracks 201, 202 and 203 of the paper processor 200. The sheet distribution device 440 corresponds in its structure and basic function to conventional devices of this type, so that a more detailed explanation is unnecessary. In accordance with an exemplary embodiment of the present invention, a method for distributing individual sheets to the three transport tracks 201, 202 and 203 of the processing station is described. The processing station in this case is the paper processor 200.

A sorting device 500 is located at the output of the paper processor 200, for resorting the sheets B. The sheets are transferred to the sorting device 500 from the three transport tracks 201, 202 and 203 in the original sequence and are stacked. The original sequence is called the arrival sequence. The sorting device 500 is also of a conventional type and therefore, does not require further explanation.

With respect to FIGS. 2–5, the numbers 1 to 10 in the rectangles, representing individual sheets, characterize the arrival sequence of the individual sheets after being transferred from the printer 100 to the sheet distribution device 400.

Figure 2:
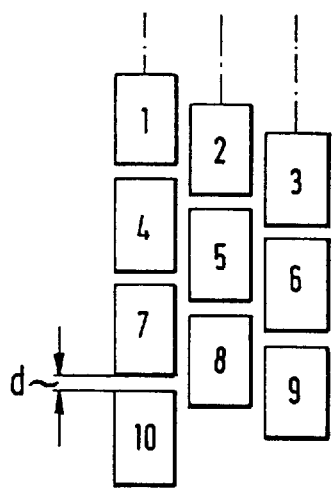
FIG. 2 illustrates distribution of sheets of equal length according to conventional methods utilizing a cyclic sequence.

FIG. 2 illustrates the distribution of sheets of equal length having a fixed cyclic distribution pattern according to conventional methods. The individual sheets lie optimally close together, except for a safety distance "d" which is inherent in the system.

Figure 3:
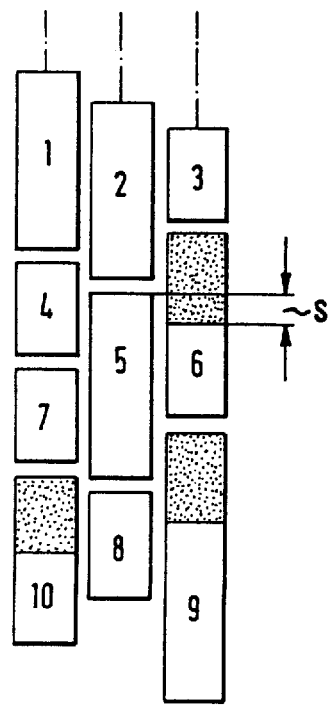
FIG. 3 illustrates distribution of sheets of various length according to conventional methods utilizing a cyclic sequence.

FIG. 3 illustrates the distribution of sheets of different length having a fixed cyclic distribution pattern according to conventional methods. This distribution pattern is designed for the later sorting of the sheets with respect to their leading transverse edges. This method requires the leading transverse edges of the sheets to come to rest in the same sequence as their arrival sequence and must be spaced apart by at least a sorting distance "s" as a condition of the system. With this distribution pattern, empty spaces are created between the individual sheets which, depending on the longitudinal distribution of the sheets, can be considerable as illustrated by the darkened portions of FIG. 3. Experience has shown that the conventional distribution patterns have lead, on the average, to a loss of 20% of space. Processor output losses are also of a similar magnitude.

Figure 4:
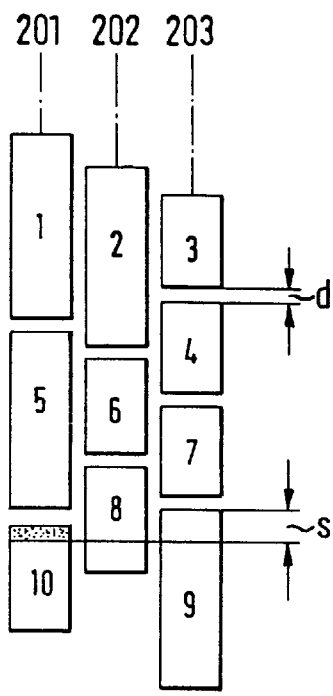
FIGS. 4 and 5 illustrate distribution of sheets of various length according to exemplary embodiments of the present invention.

FIG. 4 illustrates the distribution of sheets of different length according to an exemplary embodiment of the present invention. Unlike the conventional distribution pattern illustrated in FIG. 3, a following sheet is arranged not in accordance with a fixed cyclic distribution pattern, but is positioned on the transport track with the most available space for later sorting according to their leading transverse edges. This is the case on the transport track where the trailing transverse edge of the sheet located ahead on the track is the farthest ahead in the direction of movement. It can be seen that in this way a similarly compact distribution is achieved as with the sheets of the same length in FIG. 2. Because of the minimal sorting distance "s" as a condition of the system, small empty spaces (for example at sheet No. 10) cannot be eliminated. In actuality, this loss, on the average, is approximately 2.5%, which is a considerable improvement over the 20% loss of FIG. 3.

Figure 5:
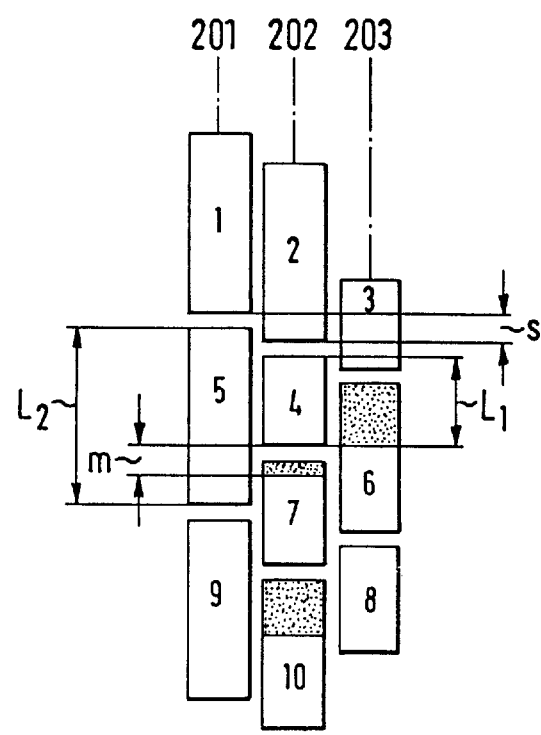

FIG. 5 illustrates the distribution of sheets of different length according to another exemplary embodiment of the present invention. The sheets, however, are distributed for sorting according to their trailing transverse edges. In this case, the trailing transverse edges of the sheets must come to lie in the same sequence as the arrival sequence of the sheets and must be spaced apart from each other by at least a sorting distance "s".

As with the embodiment illustrated by FIG. 4, the next following sheet is also positional arranged on the transport track on which the most space is available. However, this only takes place provided a further condition is being met. If this condition is not met, the sheet is arranged on the transport track in which the second most space is available. This further condition involves examining the lengths of the current sheet and the one following it. This condition is considered to have been met if the length L, of the respective sheet, which is increased by the sorting distance "s" as a condition of the system and a predetermined minimal distance "m", is not less than the length $L_2$ of the sheet following this sheet in the arrival sequence. As illustrated in FIG. 5, this condition has been satisfied for sheets with numbers 5, 6, 7, 9 and 10 but is not satisfied for sheets with numbers 4 and 8.

If the number of tracks in FIG. 3 is increased to more than three, i.e. generally "n", transport tracks, then n–1 successive sheets should be considered for this method.

Because of the minimum sorting distance "s" required by the system, occasional small empty spaces (for example, sheets 6, 7 and 10) cannot be completely avoided even with the method illustrated in FIG. 4. In actuality, this loss, on the average, is approximately 2.5%, which represents a considerable improvement over the 20% loss.

To execute a method in accordance with exemplary embodiments of the invention, the relative positions of the individual sheets on the transport tracks, or respectively on the sheet removal devices 403 to 405 leading to them, as well as the length of the individual sheets must be known to the computer 300 controlling the sheet distribution device. With the exemplary embodiment represented in connection with a minilab, the central computer 300, which also controls the printer 100, has the information regarding the length of the individual sheets following each other because of the printing jobs it performs. Since the computer 300 also controls the sheet distribution device 400, it also knows the position of the individual sheets on the transport tracks, as well as the positions of the leading and trailing transverse edges of the individual sheets, and from this it can determine the transport track with the most or second most, available space and can control the arrangement of the sheets accordingly. In case that in another application the information regarding the length of the individual sheets is not automatically available, they can be measured, for example by means of suitable sensors.

Those skilled in the art will appreciate that the foregoing embodiments are by way of example and numerous variants exist. For example, the computer 300 can be two computers connected with each other where one of the computers control the printer 100 and another controls the sheet distribution device 400.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. A method for developing and processing a photographic sheet material in a photographic processor, wherein a plurality of individual sheets of the sheet material arrive at a sheet distribution device according to an arrival sequence, said method comprising the steps of:

distributing said sheets on at least two adjacently located transport tracks of said sheet distribution device such that the sheets are sorted according to the arrival sequence wherein the distribution of the sheets is based on evaluating utilization of each of the transport tracks to minimize spaces between sheets following each other on said at least two adjacently located transport tracks while maintaining the arrival sequence and photographically developing said sheets during conveyance of said sheets along the transport tracks through a photographic developing and processing station.

2. The method of claim 1 further comprising the step of:

placing the following sheet on the transport track with the second most available space if the length of the following sheet, incremented by a distance extending to behind a leading transverse edge of a preceding sheet and a second predetermined distance, is less than the length of the next following sheet; and sorting the sheets according to a sequence of trailing transverse edges.

3. The method of claim 1 further comprising the step of:

placing the following sheet on the transport track with the most available space if the length of the following sheet, incremented by a distance extending to behind a leading transverse edge of a preceding sheet and a second predetermined distance, is not less than the length of the next following sheet; and sorting the sheets according to a sequence of trailing transverse edges.

4. The method of claim 3 wherein the sheets are distributed on the transport tracks with their trailing transverse edges being separated from each other by at least a distance extending to behind a leading transverse edge of a preceding sheet and the leading transverse edge of each sheet lying at least a first predetermined distance behind the trailing transverse edge of the sheet immediately preceding it on the same transport track.

5. The method of claim 1 further comprising the steps of:

placing each following sheet of the arrival sequence on the transport track with the most available space; and sorting the sheets that have been processed by the processing station in accordance with a sequence of a leading transverse edge of the sheet.

6. The method of claim 5 further comprising the steps of:

placing a leading transverse edge of a following sheet of the arrival sequence at least a first predetermined distance behind a trailing transverse edge of a preceding sheet on the same transport track and behind a leading transverse edge of the preceding sheet in the arrival sequence.

7. A photographic processor for processing photographic sheet material in a processing station, the processor comprising:

a control means for determining an arrival sequence according to which a plurality of individual sheets of the sheet material are delivered to the processing station;

at least two adjacently located transport tracks;

a sheet distribution device for distributing the sheets to be processed onto the transport tracks such that the sheets are sorted according to the arrival sequence, wherein the distribution of the sheets onto the tracks by the distribution device is based on evaluating utilization of each of the transport tracks to minimize spaces between the sheets following each other on said at least two adjacently located transport tracks while maintaining the arrival sequence; and a developing and processing device which develops said photographic material during said conveyance.

8. The device of claim 7 wherein the sheet distribution device arranges a next sheet in the arrival sequence on the transport track with the most available space and the sorting device sorts the sheets according to a sequence of leading transverse edges.

9. The device of claim 7 wherein the sheet distribution device places a following sheet in the arrival sequence on the transport track with the most available space if the length of this sheet, incremented by a distance extending to behind a leading transverse edge of a preceding sheet and a second predetermined distance, is equal to or greater than the length of the next following sheet in the arrival sequence and the sorting device sorts the sheets according to sequence of trailing transverse edges.

10. The device of claim 7 wherein the sheet distribution device places a following sheet in the arrival sequence on the transport track with the second most available space if the length of this sheet, incremented by a distance extending to behind a leading transverse edge of a preceding sheet and a second predetermined distance, is less than the length of the next following sheet in the arrival sequence and the sorting device sorts the sheets according to a sequence of trailing transverse edges.

* * * * *